United States Patent [19]

Roth et al.

[11] 4,203,751

[45] May 20, 1980

[54] METHOD AND APPARATUS FOR MAKING CONVEX SHEETS OF GLASS HAVING A SMALL RADIUS OF CURVATURE

[75] Inventors: Mario Roth; Hans-Peter Siemonsen, both of Aachen; Günther Schmidt, Aachen-Richterich; Hubert Sonntag; Leo Peters, both of Herzogenrath, all of Fed. Rep. of Germany

[73] Assignee: Saint Gobain Industries, Neuilly-sur-Seine, France

[21] Appl. No.: 942,272

[22] Filed: Sep. 14, 1978

[30] Foreign Application Priority Data

Sep. 17, 1977 [DE] Fed. Rep. of Germany ....... 2741965

[51] Int. Cl.² ............................................ C03B 23/02
[52] U.S. Cl. ........................................ 65/106; 65/273; 65/287; 65/291
[58] Field of Search ................. 65/106, 107, 273, 275, 65/286, 287, 291

[56] References Cited

U.S. PATENT DOCUMENTS

| | | | |
|---|---|---|---|
| 2,348,279 | 5/1944 | Boyles et al. | 65/288 |
| 2,876,592 | 3/1959 | Black et al. | 65/351 |
| 3,251,672 | 5/1966 | Touvay et al. | 65/291 |
| 3,762,903 | 10/1973 | Hamilton | 65/107 |
| 3,762,904 | 10/1973 | Hamilton et al. | 65/107 |
| 3,879,184 | 4/1975 | Hamilton et al. | 65/107 |
| 4,002,450 | 1/1977 | Hamilton et al. | 65/107 |
| 4,074,996 | 2/1978 | Hagedorn et al. | 65/273 X |

FOREIGN PATENT DOCUMENTS 1369664 7/1964 France .

*Primary Examiner*—Arthur D. Kellogg
*Attorney, Agent, or Firm*—Pennie & Edmonds

[57] ABSTRACT

A process for making a convex sheet of glass having a substantial bent portion of small radius of curvature comprising vertically suspending a heated flat sheet of glass between two molds having matching center elements and matching jointed elements mounted on the center elements for movement about an axis, moving the molds together to confine the sheet and moving the jointed elements with respect to the center elements to bend a portion of the heated sheet.

A device for making a convex sheet of glass having a bent portion of small radius of curvature including a female mold and a male mold adapted to engage a vertically suspended sheet of glass therebetween and where the molds have matching center elements and at least one set of two matching jointed elements connected to the center elements and including means for moving the joined elements of a set about an axis to bend a portion of the sheet.

23 Claims, 12 Drawing Figures

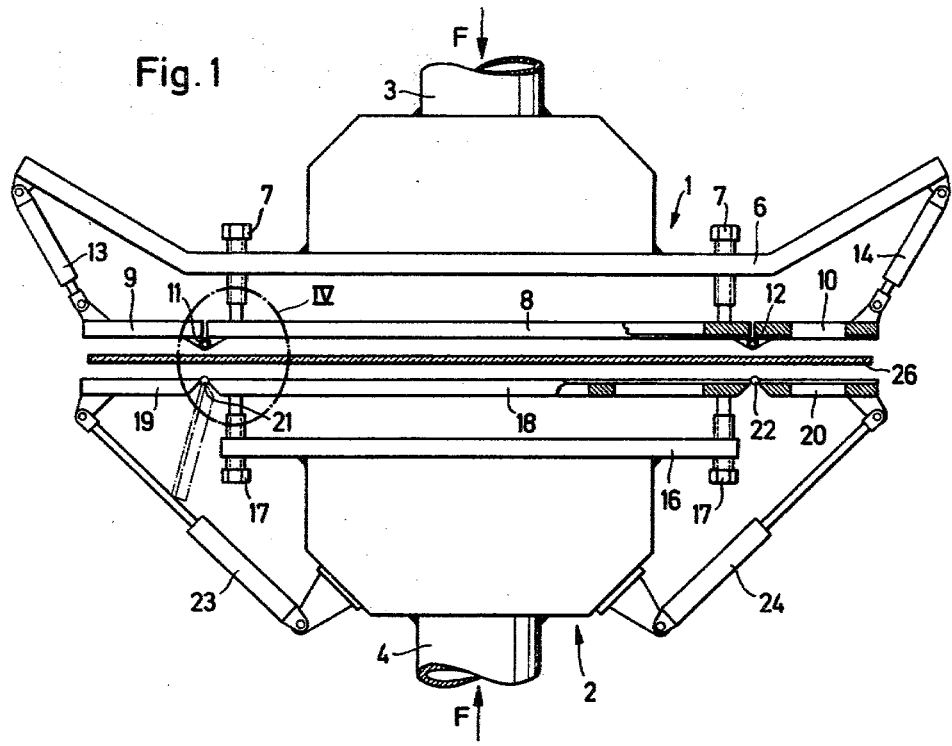
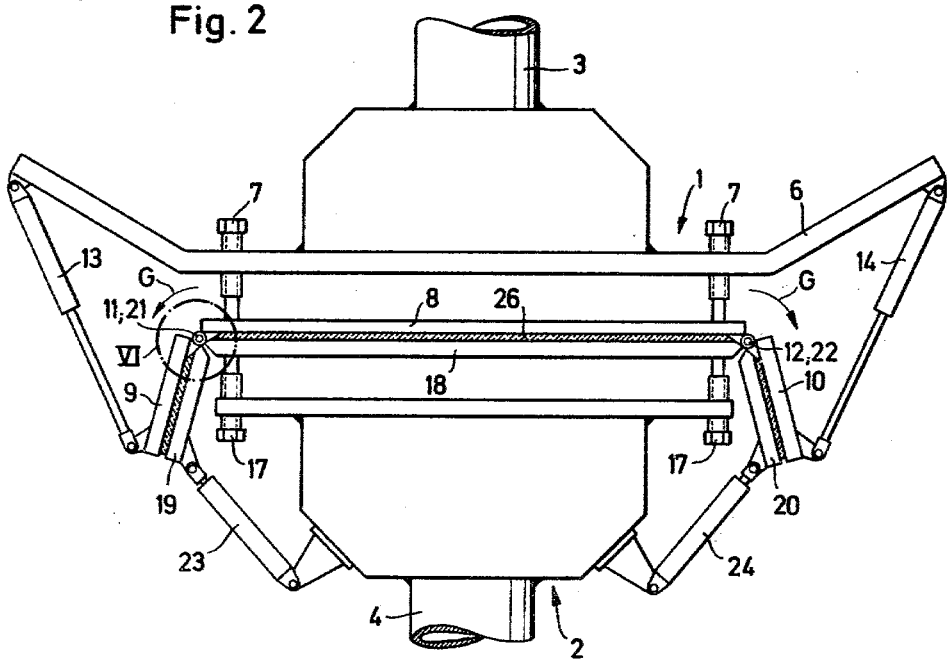

$A = D$ $M \equiv S$

METHOD AND APPARATUS FOR MAKING CONVEX SHEETS OF GLASS HAVING A SMALL RADIUS OF CURVATURE

BACKGROUND OF THE INVENTION

1. Field of the Invention

The invention concerns a process and device for manufacturing convex sheets of glass having a substantial bent portion of small radius of curvature.

2. Description of the Prior Art

Convex sheets of glass having a pronounced curvature or bend have been manufactured in the past by placing a flat sheet of glass in a horizontal position on a peripheral convexing frame or "skeleton" and subjecting the glass to a predetermined temperature profile such that when the sheet reaches a bending temperature, the sheet will sink under its own weight to wed or conform to the shape of a support.

Jointed convexing molds have also been utilized to produce convex sheets of glass where the molds comprise elements jointed together which may be bent when a sheet of glass has reached bending temperature.

It is also known in the prior art to additionally heat a sheet of glass in the area of a bend to facilitate convexing of the bend to reduce deformation of areas adjacent to the bend. This has been accomplished by placing in electric resistance element in contact with the area to be bent to provide additional heat to the area while the sheet is heated by a conventional furnace or providing an electro-resistant deposit or coating on a sheet of glass in the area to be bent and then connecting the deposit to a current source.

It is also known that bending of a portion of a sheet of glass may be facilitated by weakening the sheet in the area of the bend by means of a groove in order to obtain a sharp edge. The method has been used to facilitate convexing of a sheet of glass under the effect of its own weight when a sheet is heated.

Bending of sheets of glass to large radii of curvature has been accomplished in the past by utilizing a pressing process in which a sheet of glass is vertically suspended from clamps and the suspended sheet then heated to a bending temperature after which the sheet is engaged by a convex rigid pressing mold and an opposite concave mold comprising several movable elements. This process however is not applicable for producing sheets having a very small radii of curvature.

It is therefore an object of our invention to provide a method and apparatus applicable for the manufacture of convex sheets of glass having substantial bent portions of very small radii of curvature.

GENERAL DESCRIPTION OF THE INVENTION

Broadly the process of our invention comprises suspending a flat sheet of glass in a vertical position and heating the glass to a bending temperature. The sheet is then moved between two convexing molds comprising a male and female mold where each mold has a center element and at least one jointed element connected to the center element. The center elements of the two molds are matching and the jointed elements of the two molds are matching to form a pair or a set. The molds are then brought together to confine the sheet of glass therebetween and to provide a shaping of the portions of the sheet confined by the center elements of the mold which may either be flat or curved to provide a shape. The simultaneously jointed elements are then moved about an axis to bend the portion of the sheet engaged by the jointed elements with respect to the center portion of the sheet.

According to our process the portions of the surface of the heated glass which are to be flat or which are to be shaped only slightly are brought to their final shape by the matching center elements of the male and female molds in a first phase while the bending of the sheet around a line of bend is performed in a second phase when the jointed elements are moved or pivoted around a common axis thus retaining their respective positions with respect to the portion of the sheet engaged by the jointed elements.

The portions of the sheet on both sides of the bending line can be flat or have a developed curvature. When the areas on both sides of the bending lines are flat, the process of the invention allows the sheet to be bent to an angle of approximately 90°.

As discussed previously, each pair or set of matching jointed elements preferably pivots on a common axis such that when the female and male molds are in the closed position, the center portion of the sheet of glass is confined by the center elements and any tendency of the jointed elements to slide with respect to the sheet engaged therebetween is avoided thus protecting the optical qualities of the surface of the bent portion of the sheet.

According to a further form of the invention and in the event that the sharp angle bend is to be produced with the result that there is little or no radius of curvature, the common axis about which pairs or sets of jointed elements move is placed along a surface generating the concave face of the sheet after it has been convexed or bent to the desired shape.

Further it is advantageous that before the sheet of glass is engaged by the molds, that areas adjacent the areas of bending be heated to a greater extent than other areas. This extra or auxiliary heating may be obtained, for example, by infra-red heaters suitably placed near the area of the sheet to be bent or by covering those areas with a material that absorbs heat radiation. It is possible to use ceramic deposits which may be applied by a printing process, for example by the silk screen process in narrow bands along a bending line which in addition to providing a heat absorbing feature will also produce a decorative effect. In the event that a decorative effect is not desired, the area of the bend may be coated or deposited with an adhesive material which absorbs heat radiation and which can be removed after the sheet has been bent to the desired shape.

A further characteristic of the process of the invention is the step of holding or suspending the sheet of glass by clamps in the area of the parts of the sheet to be bent. In this instance it is advantageous to guide the clamps through an arc during the bending step where the center of the arc coincides with the common axis around which the set or pair of jointed elements of the molds move. The clamps are thus prevented from exerting any harmful stress on the sheet after bending which might produce undesirable deformations.

A device constructed to our invention used to practice the process comprises a male mold and a complementary shaped female mold. Each mold comprises a center element and at least one jointed element connected to the center element. The center elements of both molds are matching and the jointed elements of both molds are matched to form at least one set. Means are provided for moving the jointed elements in a set in synchronization in the same direction during the bending process and to move the jointed elements in a set in opposite directions after a bend has been completed and before the sheet is removed from the device.

The device is such that the jointed elements of a set move or pivot about a common axis. When the sheet is to have a sharp angle bend, that common axis is positioned in a plane corresponding to the concave face of the sheet of glass after it has been bent to the desired shape. The hinge connection between the jointed element and the central element of the female mold in some forms of the invention may project over the male mold. Another embodiment of the invention provides that the hinges connecting the jointed elements to the center element of the molds are fixed behind the convexing surface of the molds or the carrying frame carrying the surface and where the hinges comprise circular segments sliding over each other around a center placed on a common axis coinciding with the bend line of the portion of the sheet to be bent.

BRIEF DESCRIPTION OF THE DRAWINGS

FIG. 1 is a partial sectional plan view of a device constructed according to the invention prior to molds engaging a sheet of glass;

FIG. 2 is a view similar to FIG. 1 showing contact of the molds with a sheet of glass during the course of bending a portion of the sheet;

DESCRIPTION OF THE PREFERRED EMBODIMENTS

Figure 3:
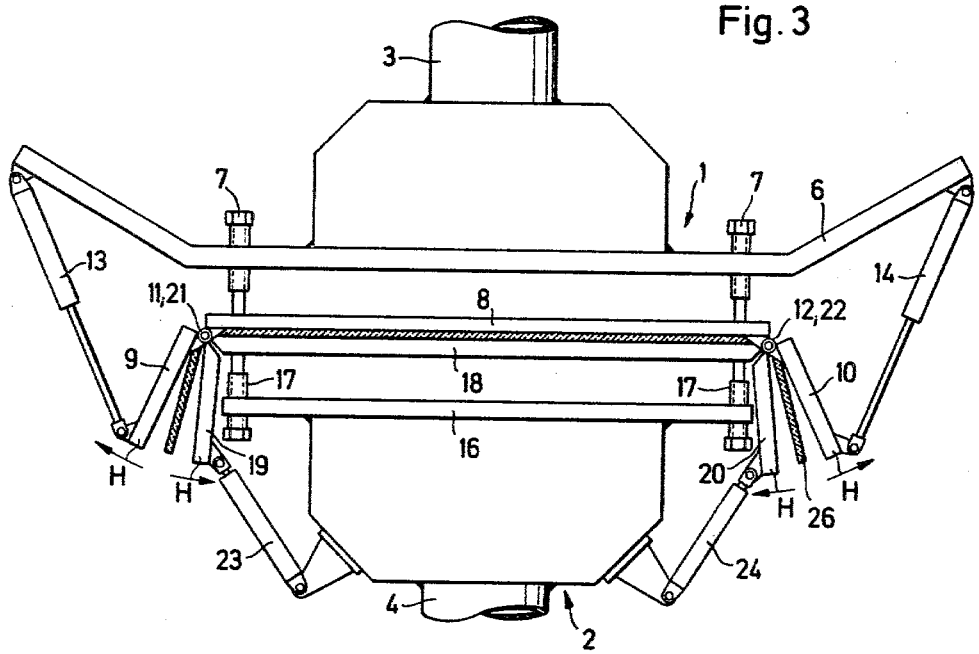
FIG. 3 is a view similar to FIG. 2 illustrating positioning of the molds immediately after a sheet of glass has been bent into the desired shape.

Referring to FIGS. 1–3, there is illustrated a device comprising a convexing or bending press utilized to bend a sheet of glass to a narrow or small degree of curvature. As shown, the device comprises a concave mold 1 serving as a matrix or female mold and a convex mold 2 serving as a stamp or a male mold. Molds 1 and 2 are carried by shafts 3 and 4 on pneumatic or hydraulic jacks. The concave female mold 1 comprises a fame 6, a center molding element 8 fastened to the frame by means of bolts 7 and two lateral jointed molding elements 9 and 10. Jointed elements 9 and 10 are connected like shutters on fixed element 8 by means of hinges 11 and 12 and are adapted to be moved by means of double-action cylinders 13 and 14. The convex male mold 2 similarly comprises a frame 16 utilizing bolts 17 to fasten a center molding element 18 thereto. Two lateral jointed elements 19 and 20 are connected to the center element 18 by means of hinges 21 and 22 and are moved by double-action cylinders 23 and 24. The jointed elements 9 and 19 together form a set or pair of opposed matching jointed elements as do the jointed elements 10 and 20 where the jointed elements form a set connected to one end of the center elements.

A sheet of glass 26 is shown positioned in FIG. 1 between the molds 1 and 2 prior to being engaged by these molds. The sheet of glass 26 is suspended by a device to be described more completely with reference to FIG. 7. The sheet is heated to a bending temperature prior to being positioned between the molds.

As soon as the sheet 26 is positioned between the two molds 1 and 2, the device is closed with the molds 1 and 2 being brought together in the direction of the arrows F until the rigid center elements 8 and 18 closely confine the center portion of the sheet while the set of jointed elements 9 and 19 and the set of jointed elements 10 and 20 confine the side portions of the sheet. This closing of the device can, if necessary, impart a curvature to the sheet of glass in its center portion as well as in its side portions if the elements are curved in the desired directions rather than being flat as shown in the drawings. Such curvature however must be essentially cylindrical or conical because the further bending of the sheet imparted by the jointed elements rends more difficult use of a spherical curvature adjacent the sharp bent portions.

Immediately after the molds 1 and 2 engage the sheet of glass 26, jacks 13 and 14 are operated to move the jointed elements 9 and 10 while at the same time jacks 23 and 24 are operated to move the jointed elements 19 and 20 around a common axis of rotation and in the direction G as shown in FIG. 2. This movement will serve to bend the side portions of the sheet of glass with respect to the central portion engaged by elements 8 and 18. The limit of bending movement of the jointed elements may be determined by stops, not illustrated.

Once the jointed elements have produced the desired bend, the jointed elements of a set are separated from each other by the jacks as shown in FIG. 3 with the jacks moved in the direction of the arrows H. After this has been done, the two molds are disengaged from the sheet of glass by a withdrawing motion of the shafts 3 and 4. The sheet of glass 26 may then be conveyed to a further treatment station, as for example, a hardening station.

Figure 4:
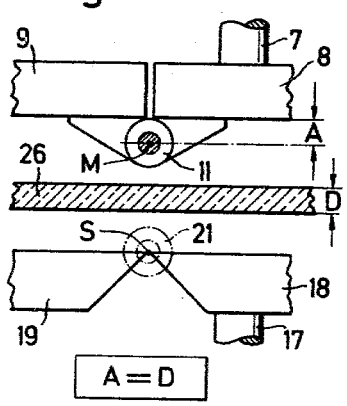
FIG. 4 is an enlarged view of a portion of FIG. 1.
Figure 5:
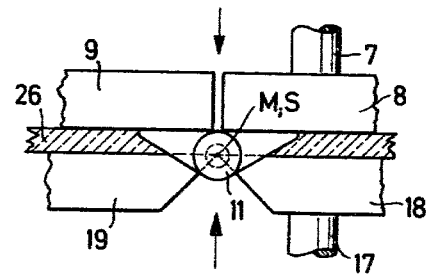
FIG. 5 is a view of FIG. 4 after portions of the molds have engaged a sheet of glass.
Figure 6:
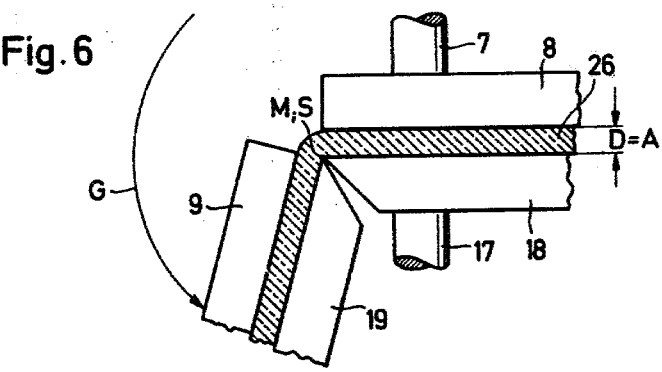
FIG. 6 is an enlarged view of a portion of FIG. 2.

The structure of the two molds 1 and 2 is such that once the sheet of glass is firmly confined by the molds, the axis of hinges 11 and 12 connecting the female mold 1 will coincide with the axis of hinges 21 and 22 connecting the male mold 2 such that the hinges will pivot or move about a common axis. Referring to FIGS. 4 and 5, the axes M of hinge 11 and S of hinge 21 are placed so as to be adjacent the face of the sheet of glass 26 when it is engaged by the male mold 2. For this purpose axis M of hinge 11 is set off a distance A from the face of elements 8 and 9 contacting sheet 26 where the distance A corresponds to the thickness D of the sheet.

Figure 7:
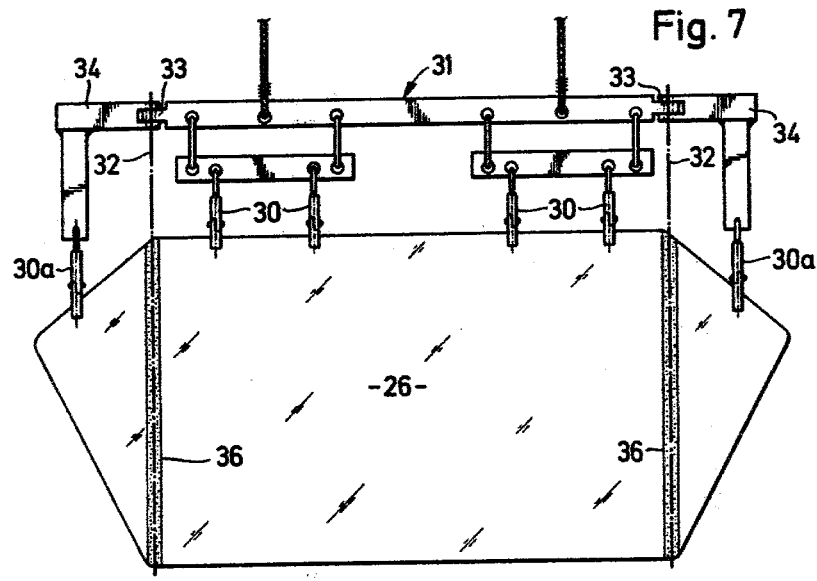
FIG. 7 is a side view of a device for vertically suspending a sheet of glass.

Referring to FIG. 7 there is illustrated a device for suspending a sheet of glass between the molds. As shown, a sheet is gripped along its upper edge, as is customary, by means of self-tightening clamps 30 and 30A. To prevent the external clamps 30A from exerting harmful stresses after bending on the side portions of the sheet, these clamps are placed on the carrying frame 31 so as to be able to follow the side portions during bending. This is accomplished by having clamps 30A suspend from a support 34 which is connected by hinge 33 to frame 31 where the center line of the hinge coincides with the bending line 32 of the side portion of the sheet to be bent.

As shown in FIG. 7, the sheet of glass 26 includes surface bands 36 of a material deposited or coated onto the glass which absorbs heat to a greater extent than glass. Enamels deposited by printing, particularly by the silk screen process, and baked onto the surface of the glass during heating are particularly suitable. Such durable enamel bands consisting, for example, of a ceramic enamel serve to heighten the optical effect of the bend and can be included for aesthetic reasons. Where an optical effect is not desired, bands of a material having particular heat absorbing qualities may be deposited onto the glass where the material does not fuse with the glass during heating and which can easily be removed after bending.

Figure 8:
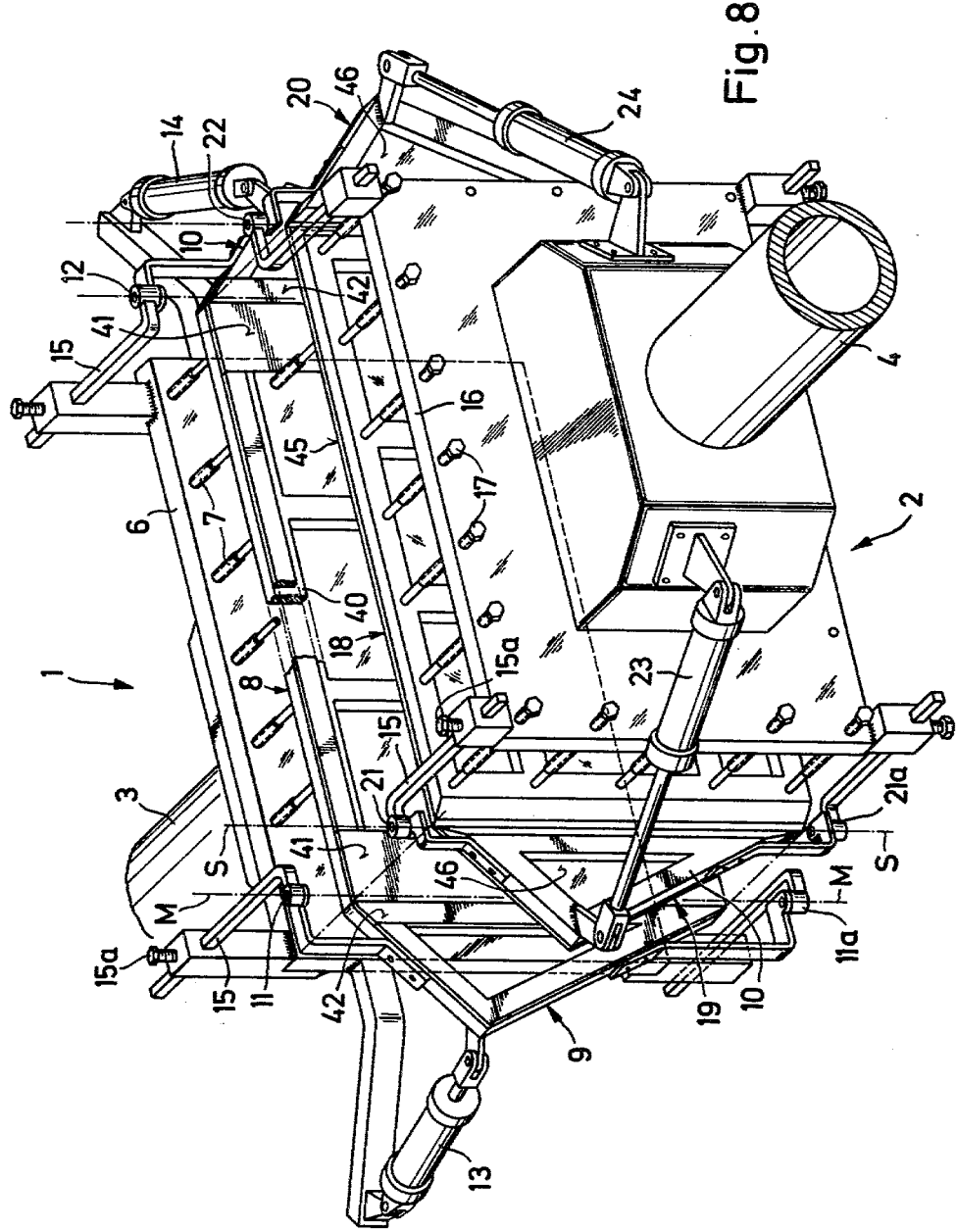
FIG. 8 is a perspective view of one embodiment of the device of FIG. 1.

Further details of the molds 1 and 2 are illustrated in FIG. 8 where the molds are shown in the open position. The center molding element 8 of the female mold 1 comprises a skeleton formed by sections 40 which are adapted to engage a sheet of glass along its upper and lower edges and along edges of the bend portions. At the bend portions, the frame has widened bearing surfaces 41 which, on bending of the sheet, support the sheet throughout the region adjacent to the bend. Lateral jointed elements 9 and 10 likewise have a skeleton form and have a bearing surface made up of a metal sheet 42 designed to support the sheet of glass in the regions adjacent the bend portion.

The male convexing mold 2 comprises a continuous or substantially solid molding surface where the center element 18 comprises a metal plate 45 and the lateral jointed elements 10 and 12 of metal plates 46.

Hinge 11a of the female mold is on the same axis M of articulation as hinge 11 and hinge 21a of the male mold is on the same axis of articulation as hinge 21. This same construction is utilized for hinges 12, 22 and the corresponding lower hinges not shown in FIG. 8 located on the opposite end of the molds. When the molds are in the closed position the four hinges 11, 11a, 21 and 21a are all on a common axis. The exact position of the hinges can be regulated to accommodate different thicknesses of glass sheets by sliding the support arms 15 after loosening screws 15a.

Figure 9:
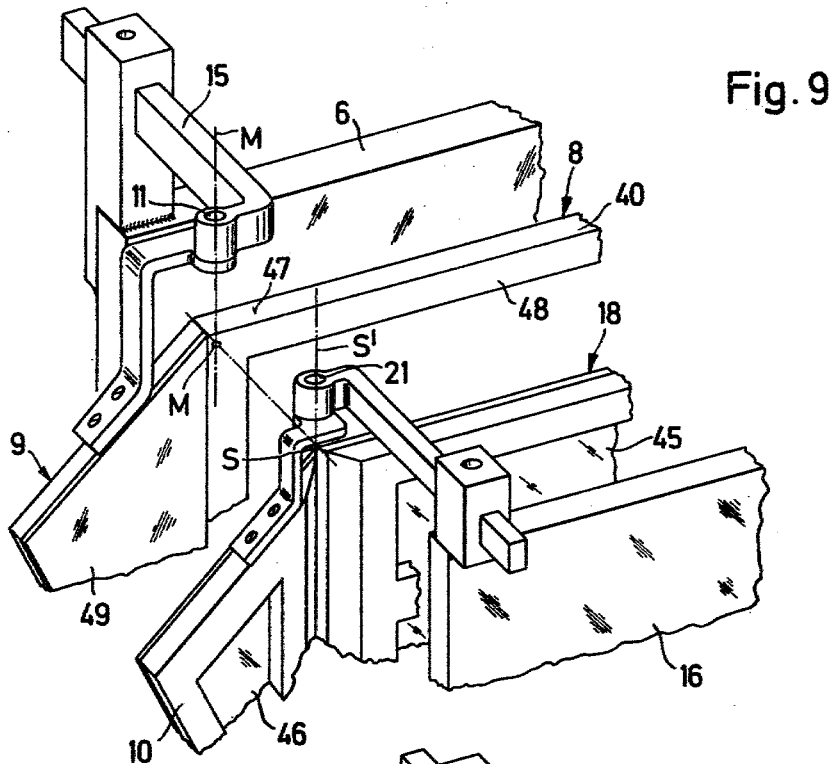
FIG. 9 is an enlarged view of a portion of FIG. 8.
Figure 10:
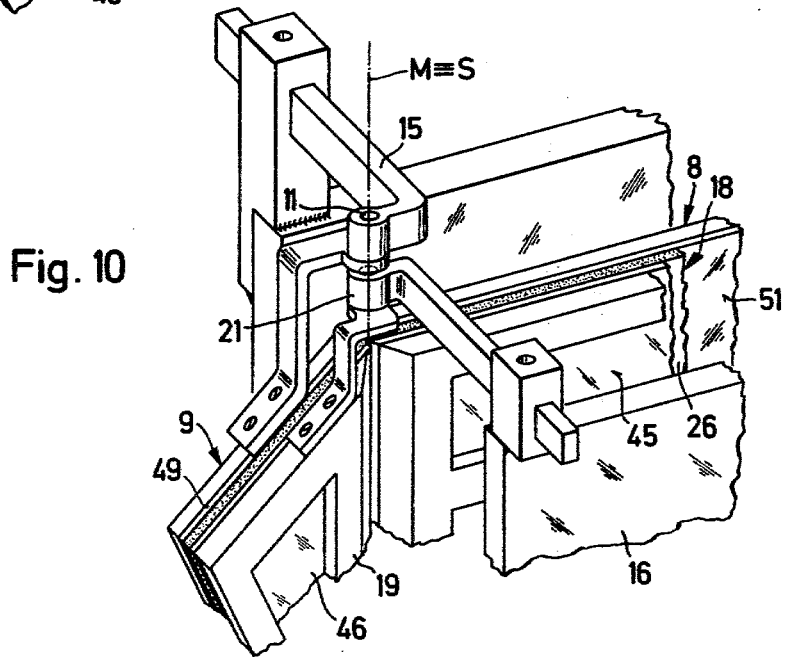
FIG. 10 is a modified embodiment of the structure of FIG. 9.

Referring to FIGS. 9 and 10, hinge 11 is shown spaced above mold 1 in order to enable hinge 21, when the molds are in the closed position, to be placed between it and the upper edge 47 of the mold 1 when the two axes S and M merge. The same arrangement is true of lower hinges 11a and 21a.

FIG. 9 in addition illustrates a slightly modified embodiment in that the center molding element 8 comprises a skeleton including a section 40 while the lateral jointed molding element 9 is covered with a metal sheet 49 over its entire surface of contact with the sheet of glass to provide a continuous support or bearing surface. Jointed element 10 of the male mold 2 is also covered by a metal plate 46 so as to present a continuous bearing surface.

All of the bearings coming into contact with the glass are conventionally covered with a fiber glass fabric which for the sake of clarity is not shown in the drawings.

FIG. 10 also illustrates a further embodiment of the invention. Here the entire surface of the center elements of both the female and male molds comprise a solid or continuous surface as well as that of the jointed elements. Thus as shown, plates 45 and 51 provide a continuous surface for the male and female molds respectively and plates 46 and 49 for the jointed elements.

Figure 11:
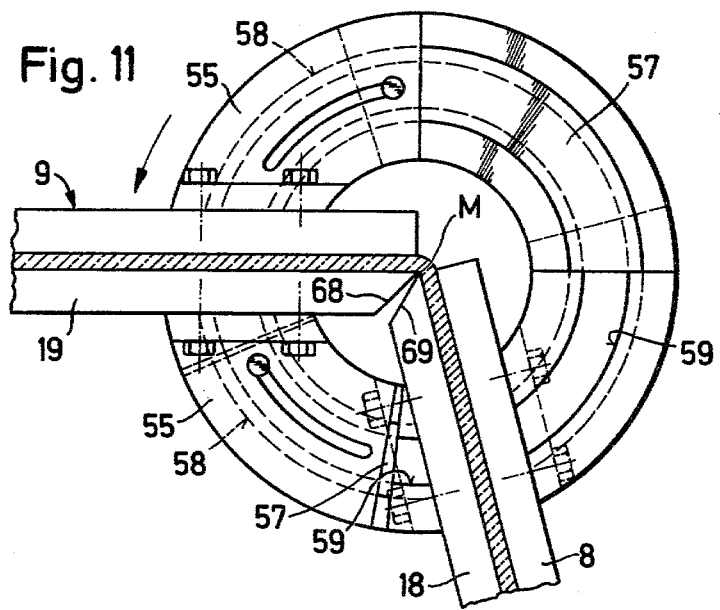
FIG. 11 is a plan view of an embodiment of a hinge construction.
Figure 12:
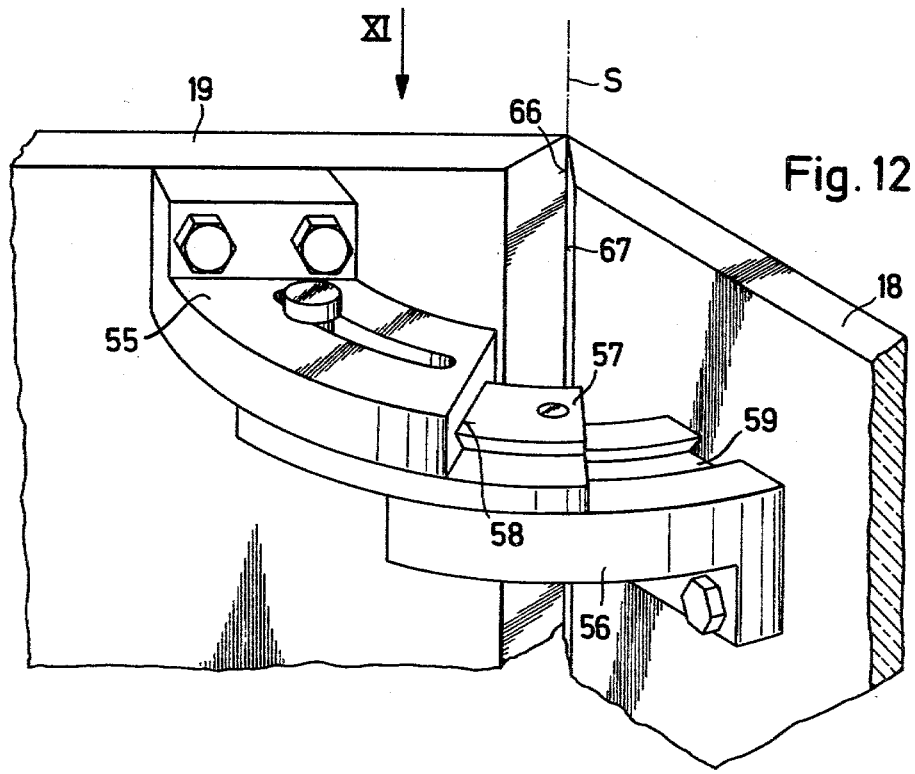
FIG. 12 is a perspective view of the hinge construction of the male mold of FIG. 11.

The upper hinges described in FIGS. 9 and 10 can in some instances interfere with the suspension clamps holding the sheet of glass when the molds are brought together. FIGS. 11 and 12 illustrate a hinge construction which overcomes that disadvantage where the particular hinge construction shown is devoid of a center pin and which has instead circular elements which slide over each other along an arc the center of which is on the bending line of the bent portion of the sheet of glass. These circular segments are each fastened on the face of the center element and face of the jointed element opposite the face of the elements adapted to engage the sheet of glass. As shown in FIGS. 11 and 12, the hinge of the male mold comprises a circular segment 55 which is screwed onto the jointed element 10, a similar segment 56 screwed onto the center element 18 and an intermediate circular slide block 57. The faces opposite the two circular segments 55 and 56 are provided with two similar dove-tailed grooves 58 and 59 while slide block 57 has two corresponding male slides for sliding in these grooves whereby the block is confined between the segments 55 and 56. Elements 18 and 19 are beveled along their adjacent sides to provide an edge 66 on element 18 and an edge 67 on element 19 as well as a face 68 on element 19 and a face 69 on element 18. Thus movement of the element 19 about the axis allows the edges 66 and 67 to remain immobile while the beveled faces 68 and 69 provide a cut-out portion so as not to interfere with rotation.

We claim:

1. A process for making a convex sheet of glass having a substantial bent portion of small radius of curvature comprising the steps of vertically suspending a flat sheet of glass, heating said flat sheet to a bending temperature, confining said flat sheet between two molds having matching center elements and matching jointed elements, and moving simultaneously the matching jointed elements of both molds with respect to the center elements in the same direction to bend a portion of said sheet confined by said jointed elements with respect to a portion of said sheet confined by said center elements.

2. A process according to claim 1 in that the step of moving the jointed elements includes moving the jointed elements about a common axis.

3. A process according to claim 2 in that the common axis is positioned along a surface generating a concave surface of the sheet of glass after it has been bent.

4. A process according to claim 2 wherein the step of suspending the flat sheet of glass includes use of clamps which engage the upper edge of the flat sheet in the region to be bent and where the clamps move in an arc the center of which coincides with said common axis.

5. A process according to claim 1 including the additional step of additionally heating the region of the flat sheet which is to be bent to a small radius of curvature.

6. A process according to claim 1 including the additional step of moving said matching jointed elements in opposite directions away from each other before moving the center elements away from each other to release the sheet of glass from said molds.

7. A device for making a convex sheet of glass having a substantial bent portion of small radius of curvature including suspension means for vertically suspending a flat sheet of glass, a female mold and a male mold movable respectively towards and away from each other adapted to engage a sheet of glass suspended therebetween, said mold having two matching center elements and at least one set of two opposed matching jointed elements connected to one end of the center elements with the matching jointed elements of a set being simultaneously movable with respect to the center elements about an axis to confine a portion of a sheet of glass and to impart a bend in a sheet of glass engaged by said molds, and means for moving said matching jointed elements about said axis.

8. A device according to claim 7 including a plurality of sets of matching jointed elements and including means for simultaneously moving together all sets of matching jointed elements.

9. A device according to claim 8 wherein the means for simultaneously moving together all sets of matching jointed elements includes means for moving the jointed elements of a set in opposite directions.

10. A device according to claim 7 wherein the matching jointed elements of a set are movable about a common axis.

11. A device according to claim 10 where said common axis lies along the concave surface of a sheet of glass after it has been bent.

12. A device according to claim 7 wherein each mold includes in addition a bearing frame to which a center element is fastened and a set of matching jointed elements joined to the center elements of the molds on opposite ends of the center elements.

13. A device according to claim 7 wherein the center element of the male mold when engaging a sheet of glass provides a bearing surface for the sheet along the line of a bend imparted to the sheet.

14. A device according to claim 13 wherein said center element of the male mold comprises a continuous surface.

15. A device according to claim 13 wherein a jointed element of a set forming part of the male mold comprises a skeleton structure.

16. A device according to claim 13 wherein a jointed element of a set forming part of the male mold when engaging a sheet of glass provides a bearing surface for the sheet adjacent the line of a bend imparted to the sheet.

17. A device according to claim 16 wherein the jointed element of a set forming part of the male mold comprises a continuous bearing surface.

18. A device according to claim 7 wherein the center element of the female mold comprises a skeleton structure.

19. A device according to claim 18 wherein the center element of the female mold when engaging a sheet of glass provides a bearing surface adjacent the line of a bend imparted to the sheet.

20. A device according to claim 7 wherein the jointed element of a set forming part of the female mold comprises a skeleton structure.

21. A device according to claim 7 wherein the jointed element of a set forming part of the female mold comprises a continuous bearing surface.

22. A device according to claim 7 wherein the adjacent sides of the center element and jointed element forming the male mold are beveled to provide closely adjacent edges adapted to engage a sheet of glass when the jointed element forming part of the male mold is moved about an axis.

23. A device according to claim 7 including in addition hinge means mounting each jointed element for movement with respect to a center element with the hinges being connected to the opposite sides of the elements adapted to engage a sheet of glass and with the hinges associated with each set of jointed elements having a common axis.

* * * * *